US008225473B2

(12) United States Patent
Kliskey

(10) Patent No.: US 8,225,473 B2
(45) Date of Patent: Jul. 24, 2012

(54) INDUSTRIAL TIRE RING TOOL

(75) Inventor: Roger Kliskey, Brimfield, OH (US)

(73) Assignee: Summit Tool Company, Akron, OH (US)

( * ) Notice: Subject to any disclaimer, the term of this patent is extended or adjusted under 35 U.S.C. 154(b) by 1309 days.

(21) Appl. No.: 11/404,527

(22) Filed: Apr. 14, 2006

(65) Prior Publication Data

US 2007/0240296 A1 Oct. 18, 2007

(51) Int. Cl.

| | |
|---|---|
| ***B23P 19/04*** | (2006.01) |
| ***B60C 25/132*** | (2006.01) |
| ***B25C 11/00*** | (2006.01) |
| ***B66F 15/00*** | (2006.01) |

(52) U.S. Cl. ............................ 29/229; 157/1.33; 254/25

(58) Field of Classification Search .................... 29/229; 157/1.33, 1.17; 254/25, 21

See application file for complete search history.

(56) References Cited

U.S. PATENT DOCUMENTS

| | | | | | |
|---|---|---|---|---|---|
| 1,221,323 | A | * | 4/1917 | Hawes | 254/25 |
| D59,371 | S | * | 10/1921 | Mess | D8/89 |
| 2,188,211 | A | * | 1/1940 | Tilson | 157/1.3 |
| 2,311,789 | A | * | 2/1943 | Taylor | 157/1.3 |
| 2,344,704 | A | * | 3/1944 | Krantz | 157/1.17 |
| D163,385 | S | * | 5/1951 | Hill | D8/81 |
| 3,608,834 | A | * | 9/1971 | MacLaren | 239/571 |
| 4,844,416 | A | * | 7/1989 | Hand | 254/25 |
| 5,343,921 | A | * | 9/1994 | Kusner | 157/1.3 |
| 5,695,172 | A | * | 12/1997 | Hreha | 254/25 |
| 5,887,327 | A | * | 3/1999 | Erickson | 29/252 |
| 6,012,705 | A | * | 1/2000 | Staten | 254/50.1 |
| 6,173,941 | B1 | * | 1/2001 | Johnston | 254/89 H |
| 6,257,553 | B1 | * | 7/2001 | Khachatoorian | 254/25 |
| 6,302,375 | B1 | * | 10/2001 | Heil et al. | 254/17 |
| 6,422,285 | B1 | * | 7/2002 | Gonzaga | 157/1.24 |
| 6,752,380 | B1 | * | 6/2004 | Taylor et al. | 254/25 |
| D493,086 | S | * | 7/2004 | Taylor et al. | D8/89 |

* cited by examiner

*Primary Examiner* — Joseph J Hail
*Assistant Examiner* — Alvin Grant
(74) *Attorney, Agent, or Firm* — Renner Kenner Greive Bobak Taylor & Weber

(57) ABSTRACT

A tire ring tool used in connection with a lock ring and a retaining ring for securing a tire on a rim, the ring tool including a handle and a working end extending from the handle adapted to manipulate the lock ring.

24 Claims, 10 Drawing Sheets

INDUSTRIAL TIRE RING TOOL

TECHNICAL FIELD

The present invention generally relates to a tool for attaching and removing a retaining ring associated with an industrial tire rim.

BACKGROUND OF THE INVENTION

Solid tires are used in various applications, including industrial applications such as lift trucks and similar vehicles. Solid tires are mounted on rims by pressing the tire onto the rim. Many of the solid tire rims have integral flanges on one side and removable rings that attach to the rim on the opposite side to retain the tire between the rings and the flange. Consequently, when mounting the solid tire, the rim is placed in a press with the flange located away from the forcing ram of the press. The tire is then fitted over the opposite side of the rim, and the press pushes the tire onto the rim by applying force to a “cage”. The cage includes a pair of flat rings spaced vertically by circumferentially-spaced supports extending between the two rings. One ring is contacted by the press, and the opposite ring engages the circumference of the solid tire. The available space inside the cage allows the operator to attach or remove the lock ring after the solid tire has been pressed, and held, onto the rim. Since the cage restricts the area within which the user can operate when attaching and removing the lock ring, and since these relatively small rings are extremely inelastic and difficult to handle, it is believed to be desirable to provide a tool that will assist in this operation.

SUMMARY THE INVENTION

Therefore, it is an object of the present invention to provide a tool that will help users manipulate the retaining ring for a solid tire.

In light of this object, the present invention generally provides a tire ring tool used in connection with a lock ring and a retaining ring to secure a tire on a rim, the ring tool including a handle and an install end supported on the handle. The install end includes an arm extending radially outward from the handle, a body portion extending from the arm and terminating in a tip adapted for insertion between the rim and the lock ring, where the body portion defines a notch that extends axially outward relative to the tip.

The present invention further provides a tire ring tool used in connection with a retaining ring and a lock ring for securing a solid tire on a rim, the ring tool including a handle and a separating end extending radially outward from the handle. The separating end includes a body portion having an outer radial edge that terminates in a tip at its axial and radial outer extremity, where the body portion defines a notch adjacent to the tip that opens axially outward.

The present invention further provides a tire ring tool used in connection with a retaining ring and a lock ring for securing a solid tire on a rim, the ring tool including a handle and a lifting end extending generally radially outward from the handle. The lifting end has a body portion that curves axially inward as it extends radially outward and terminates in a tip and a projection extending radially outward from the tip, where the projection has a lesser lateral dimension than the tip, and the tip extends laterally outward of the projection to form a shoulder.

The present invention further provides a tire ring tool used in connection with a retaining ring and a lock ring for securing a solid tire on a rim, the ring tool including a handle and a removal end extending generally axially outward from the handle. The removal end includes a body portion having a first portion extending axially outward and radially outward from the handle and a second portion extending axially outward and radially inward from the first portion, where the joint formed by the connection of the first and second portions extends radially outward of the handle, and the second portion terminates in a tip adapted to be inserted between the lock ring and the retaining ring.

The present invention further provides a tire ring tool used in connection with a retaining ring and a lock ring for securing a solid tire on a rim, the ring tool including a handle, an install end supported on one end of the handle and a removal end supported on the other end of the handle. The install end includes an arm extending radially outward from the handle and a body portion extending radially outward from the arm. The body portion terminates in a tip and defines a notch radially inward of the tip, where the notch opens axially inward. The removal end includes a body portion having a first portion extending axially outward and radially outward from the handle and a second portion extending axially outward and radially inward from the first portion forming a joint therebetween. The joint extends radially outward of the handle, and the second portion terminates in a tip adapted for insertion between the lock ring and the retaining ring.

The present invention further provides a tire ring tool used in connection with a retaining ring and a lock ring for securing a solid tire to a rim, the ring tool including a handle, a separating end supported on one end of the handle, and a lifting end supported on the opposite end of the handle. The separating end includes a body portion extending radially outward from the handle, a tip extending from the body portion at an axial and radial extremity thereof, where the body portion defines a notch radially inward of the tip that opens axially outward. The lifting end includes a body portion extending radially outward from the handle terminating in a tip, where the body portion curves axially inward as it extends radially outward. The lifting end further includes a projection extending radially outward from the tip, where the tip is wider than the projection forming a shoulder adjacent to the projection.

The present invention further provides a tire ring tool kit including a handle, an install end, a removal end, a lifting end, and a separating end supportable on the handle. The install end includes an arm extending radially outward from the handle, a body portion extending radially outward from the arm, where the body portion terminates in a tip and defines a notch radially inward of the tip that opens axially inward. The removal end includes a body portion having a first portion extending axially outward and radially outward from the handle and a second portion extending axially outward and radially inward from the first portion forming a joint therebetween. The joint extends radially outward of the handle, and the second portion terminates in a tip adapted for insertion between the lock ring and the retaining ring. The separating end includes a body portion extending radially outward from the handle, a tip extending from the body portion at an axial and radial extremity thereof, where the body portion defines a notch radially inward of the tip that opens axially outward. The lifting end includes a body portion extending radially outward from the handle terminating in a tip, where the body portion curves axially inward as it extends radially outward, and a projection extending radially outward from the tip, where the tip is wider than the projection forming a shoulder adjacent to the projection.

DETAILED DESCRIPTION OF THE INVENTION

Figure 4:
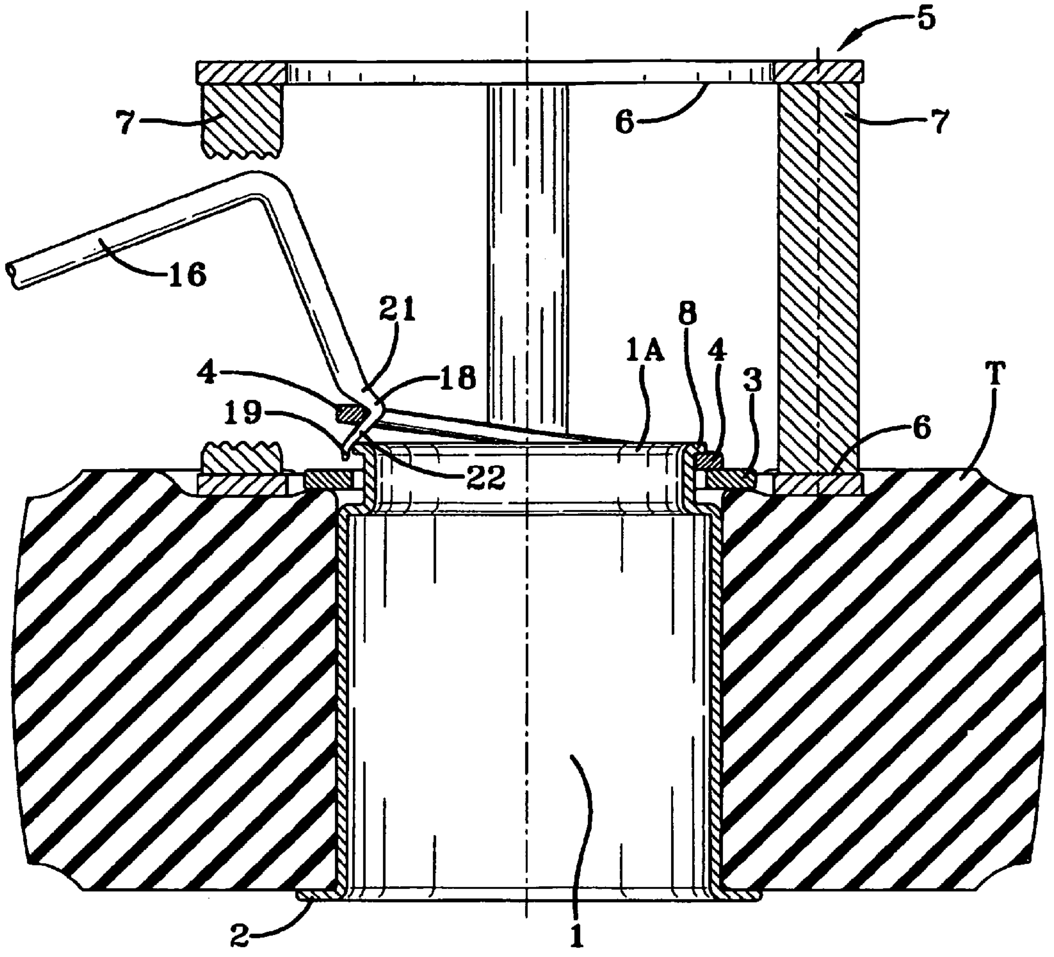
FIG. 4 is a partially schematic, partially sectioned side elevational view of a solid tire mounted on a rim, depicting details of the operation of the first working end.

A solid tire T is shown in FIG. 4 mounted on a rim 1 having an integral flange 2 that is located on one side of tire T and a removable retaining ring 3 held in place by a lock ring 4 on the opposite side of tire T. In mounting tire T on the rim 1, the rim 1 may be arranged with the flange 2 down so that tire T is pressed downward onto rim 1. To that end, a press (not shown) applies force to the tire T through a cage 5. As shown, the cage 5 typically includes a pair of rings 6 spaced vertically by supports 7 defining a confined area in which the user must operate to fix the retaining ring 3 on the opposite side of tire T. With tire T mounted on the rim 1, a portion, generally indicated at 1A, of rim 1 axially extends beyond tire T. This portion 1A includes a retaining flange 8 that defines an annular groove 9 about rim 1 and above the mounted tire T. Retaining ring 3 defines a bore larger than the diameter of the exposed portion of the rim 1 so that the retaining ring 3 slides easily over the exposed portion and engages the sidewall of tire T. Lock ring 4 has a diameter that generally conforms to that of the groove 9 and must be stretched over the retaining flange 8 to seat it within the groove 9. In this position, lock ring 4 holds retaining ring 3 in place. Lock ring 4 is typically a split ring so that it may be stretched over the retaining flange 8. Presently, this is done by inserting a screwdriver between retaining flange 8 and lock ring 4 and attempting to stretch lock ring 4 over flange 8 with the screwdriver. The confined space defined by the cage and the limited leverage provided by a screwdriver makes this operation extremely difficult. Also, given the limited reach of the screwdriver, the user typically is forced to operate with their hands inside the cage 5, further limiting the range of motion of the screwdriver and at times causing injury.

To overcome the deficiencies of using a screwdriver, a ring tool has been provided for manipulating lock ring 4. While ring tool 10 will be described in connection with a solid tire, it will be appreciated that ring tool 10 may be used in connection with any rim that uses a lock ring to secure the tire on the rim, including pneumatic tires. In general, lock rings are used in industrial tire applications, but this should not be considered limiting and is mentioned only as an example of one application in which the ring tool 10 may be used. In general, a ring tool 10 according to the concepts of the present invention includes at least one working end for manipulating lock ring 4 and a handle 12 that can be grasped outside of the cage 5 by the user.

Figure 1:
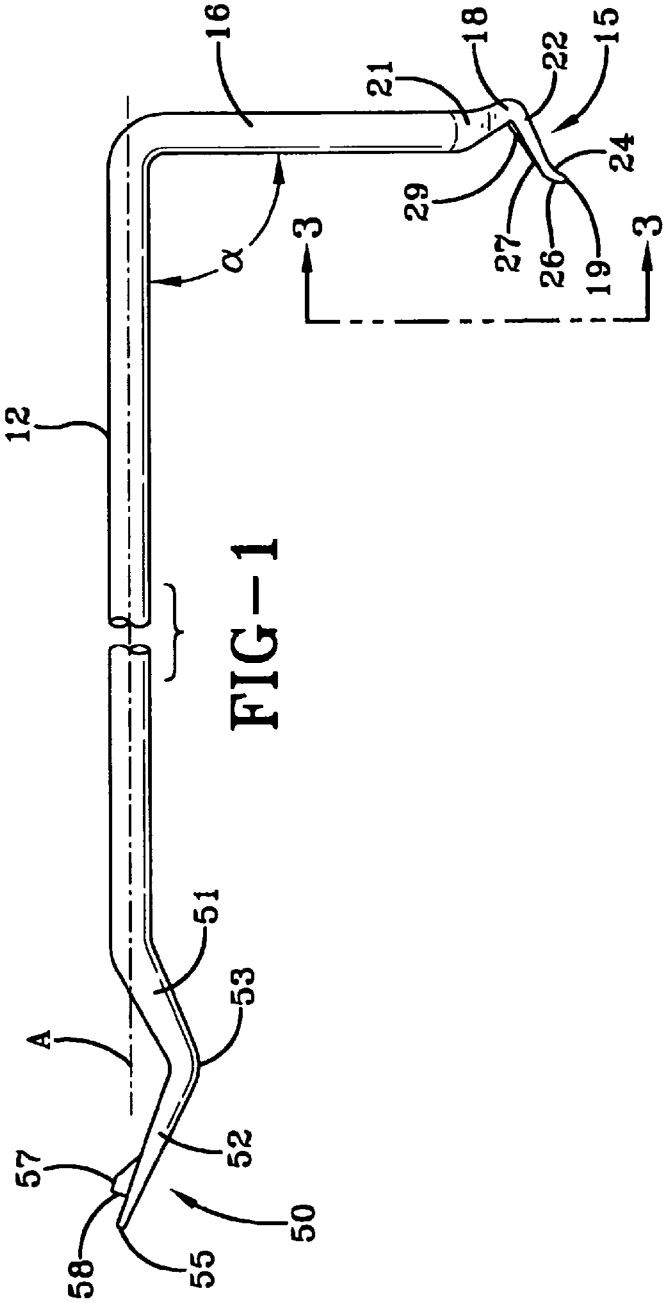
FIG. 1 is a right side elevational view of a tire ring tool according to the concepts of the present invention having a first working end and a second working end.

FIG. 1 shows one ring tool according to the concepts of the present invention, generally indicated by the number 10, having a handle 12. Handle 12 generally defines an axis A. The terms "axial" and "axially" and "radial" and "radially" will be used in their directional sense with reference to axis A of tool 10 and are not to be considered limiting in terms of the tool's cross-sectional shape, which may be non-circular. The handle 12 may also include an offset or other deviations along its length.

Figure 3:
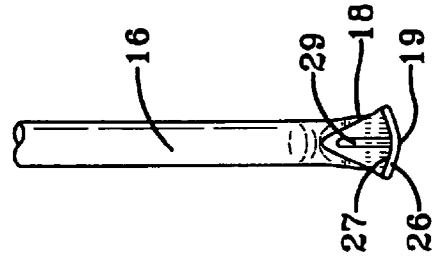
FIG. 3 is a rear elevational view as might be seen along line 3-3 in FIG. 1, partially fragmented to show details of the first working end.
Figure 2:
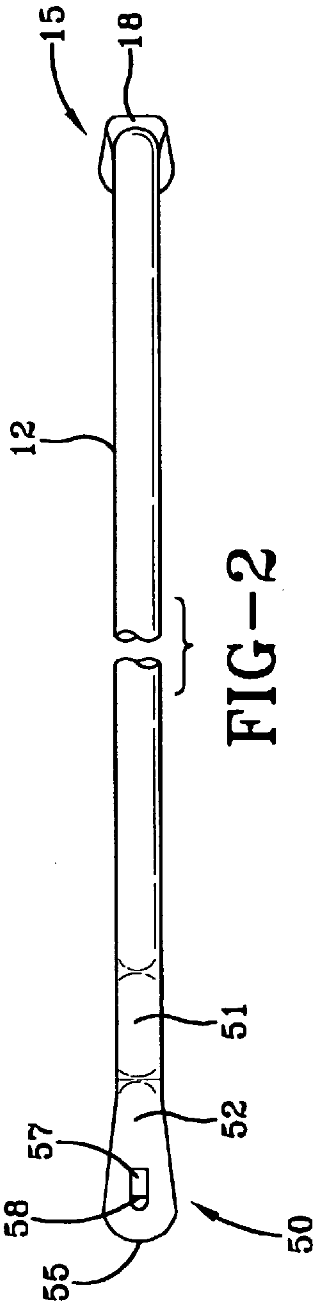
FIG. 2 is a top plan view of the tire ring tool depicted in FIG. 1, partially fragmented to show details of the first working end.

A first working end referred to as an "install end," generally indicated by the number 15, extends radially outward from handle 12. Install end 15 may include an arm 16 that extends radially from the handle 12 a selected length. It will be appreciated that the length of the arm 16 may be adjusted according to the confines of the cage 5 and the leverage needed to mount lock ring 4. Install end includes a body portion 18 and a tip 19. The tip 19 may be flattened to facilitate its insertion between lock ring 4 and the retaining flange 8. Also, as best shown in FIG. 3, tip 19 may be rounded or otherwise narrow inward toward the center of tip 19 as it extends outward to further facilitate its insertion.

Body portion 18 defines a notch 20 adapted to receive lock ring 4. Since lock ring 4 has a smaller diameter than retaining flange 8 against which tip 19 bears, body portion 18 may initially extend axially outward at a first portion 21 so that notch 20 is located sufficiently inward of retaining flange 8 to capture lock ring 4. To locate the tip 19 outward of retaining flange 8, body portion 18 may extend axially inward at a second portion 22. As shown, the extension of second portion 22 may be sufficient to place tip 19 axially inward of arm 16. To help tip 19 capture the edge of retaining flange 8, the tip 19 may extend radially outward relative to second portion 22 of body portion 18, forming a shallow recess 24 for capturing the retaining flange 8 between the body portion 18 and tip 19. As will be discussed more completely below, as tool 10 is rotated downward to pull lock ring 4 over retaining flange 8, tip 19 works inwardly around the edge of retaining flange 8 into the groove 9, such that lock ring 4 is guided around the edge and into the groove 9 as well. To facilitate release of lock ring 4 from the tip 19, the lower surface 26 of tip 19 may be rounded away from the lower surface 27 of second portion 22. To reduce the frictional forces between second portion 22 and lock ring 4, facilitating its release, lower surface 27 of second portion 22 may include a protrusion 29 that reduces the contact area between the second portion 22 and lock ring 4. As shown, protrusion 29 may be formed near the center of second portion 22. Protrusion 29 may have any shape or configuration suitable for providing less surface area than the entire second portion 22 to contact lock ring 4, including, for example, the raised line-type protrusion shown. It will be appreciated that protrusion 29 may be formed integrally as part of the portion 22 or separately by attaching material to lower surface 27.

Figure 5:
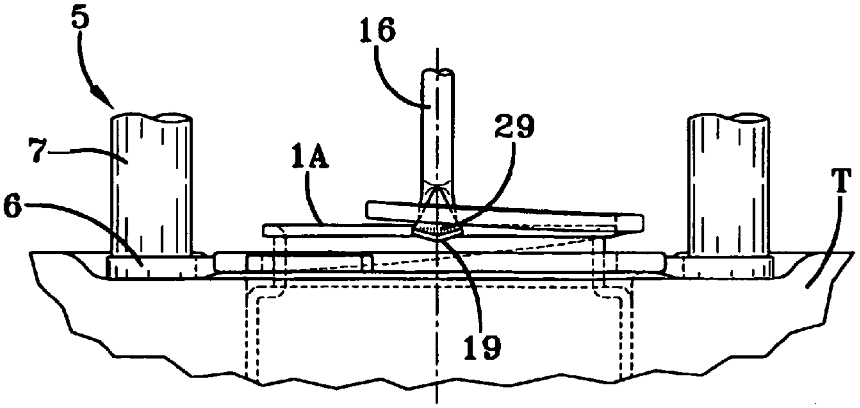
FIG. 5 is a partially schematic rear elevational view, similar to FIG. 4, depicting operation of the first working end.
Figure 6:
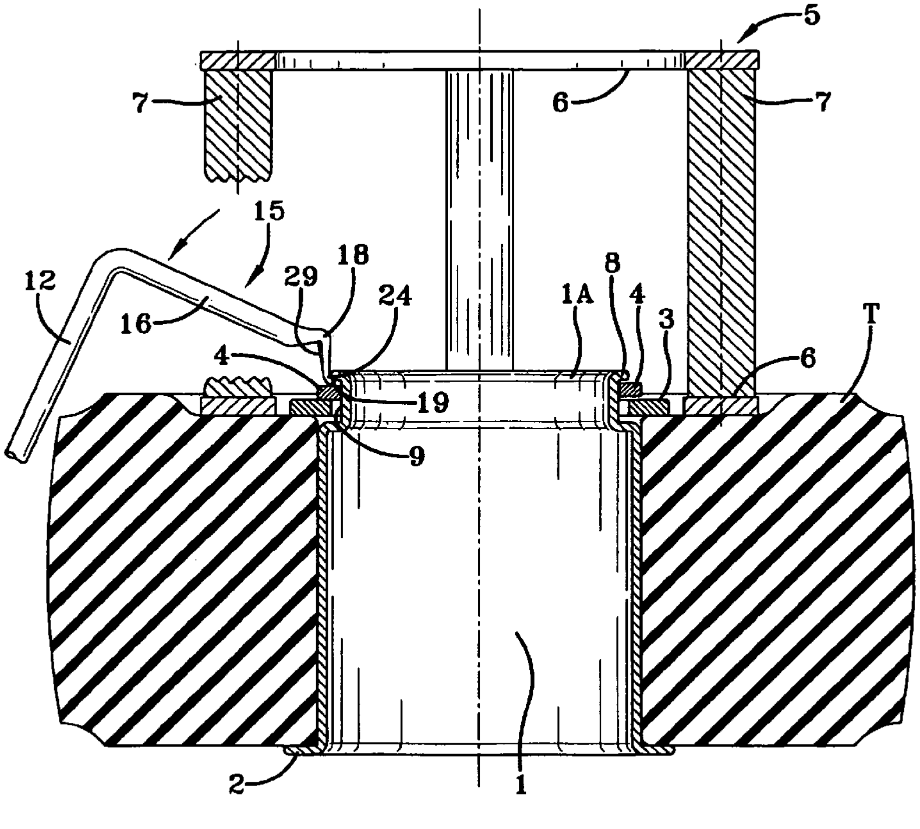
FIG. 6 is a side elevational view, similar to FIG. 4, depicting operation of the first working end, where the first working end has been rotated downward to stretch a lock ring over a retaining flange of the rim and into a groove to secure the retaining ring against the tire.
Figure 7:
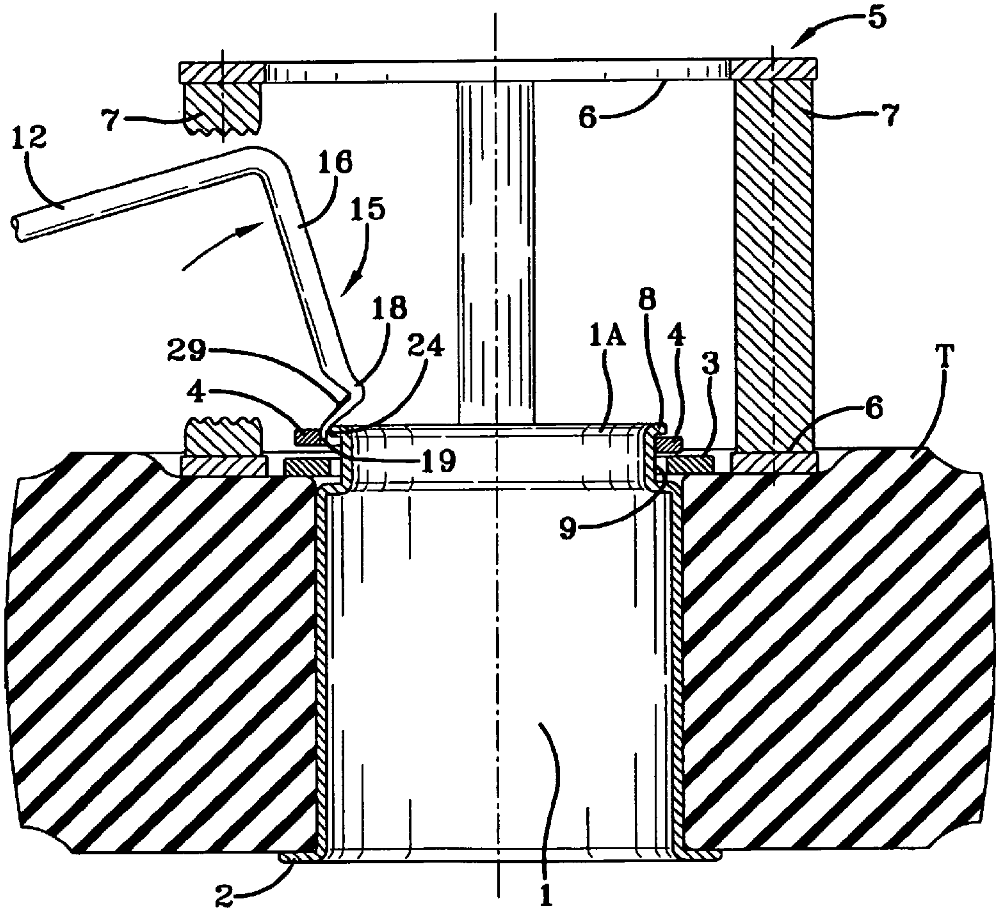
FIG. 7 is a side elevational view, similar to FIG. 6, showing removal of the first working end after the lock ring has been installed.
Figure 9:
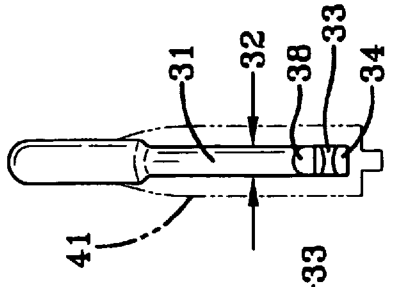
FIG. 9 is a front elevational view of the tool depicted in FIG. 8.

With reference to FIGS. 4-7, one method of mounting lock ring 4 with the ring tool 10 is shown. As shown in FIG. 4, the working end 15 is inserted radially inward of the lock ring 4, receiving lock ring 4 within the recess 20 such that the body portion 18 extends into the bore of lock ring 4 at 21 and outward on the opposite side of lock ring 4 at 22 so that the tip 19 contacts the edge of the retaining flange 8. In this position, as shown, arm 16 may extend in a generally vertical direction within the confines of cage 5, and the handle 12 extends outward of the cage 5 (FIG. 4*a*) to be grasped by the user. As best shown in FIG. 5, in this position, lock ring 4 is trapped in the recess 20 with first portion 21 bearing against the interior of lock ring 4 to force it radially outward as the tool 10 is rotated. Also, it can be seen in FIG. 5 that the lower surface of lock ring 4 rests on the reduced area provided by the protrusion 29. Thus, as tool 10 is rotated, the reduced surface area of protrusion 29 offers less resistance to the downward travel of lock ring 4. Turning to FIG. 6, to stretch lock ring 4 over retaining flange 8, the user simply rotates handle 12 downward, which causes the first portion 21 to rotate radially outward of the retaining flange 8, allowing lock ring 4 to drop along second portion 22 into groove 9 formed beneath retaining flange 8. Removal of the tool 10 is shown in FIG. 7 and may be accomplished by rotating the handle 12 upward to release it from between lock ring 4 and retaining flange 8. As necessary, this process may be repeated around the ring's circumference to completely install lock ring 4 in groove 9.

Figure 8:
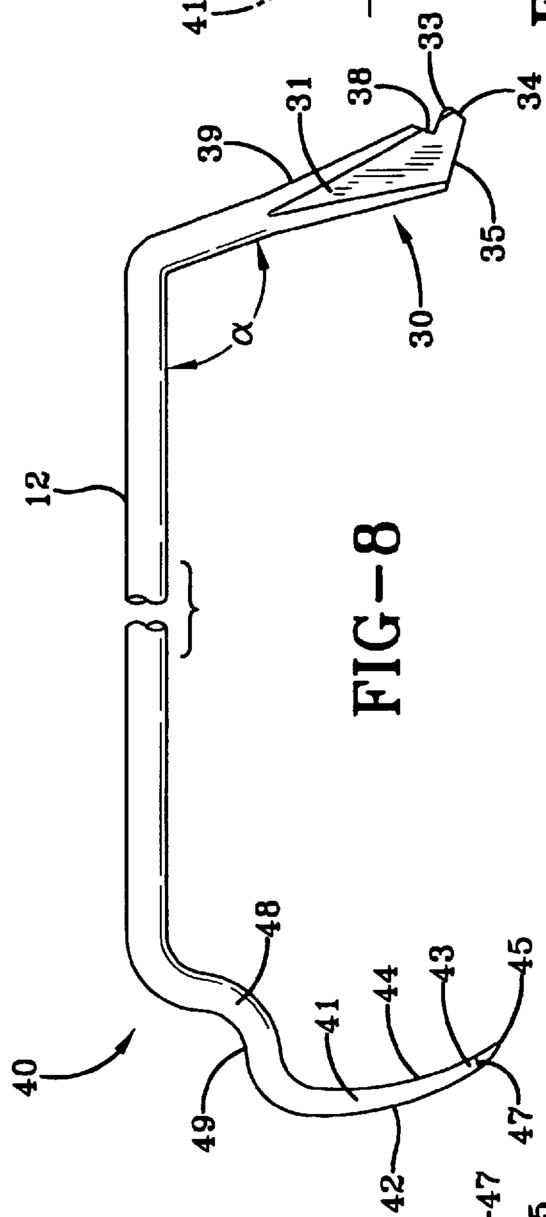
FIG. 8 is a right side elevational view of a solid tire ring tool according to the concepts of the present invention having a third working end and a fourth working end.
Figure 10:
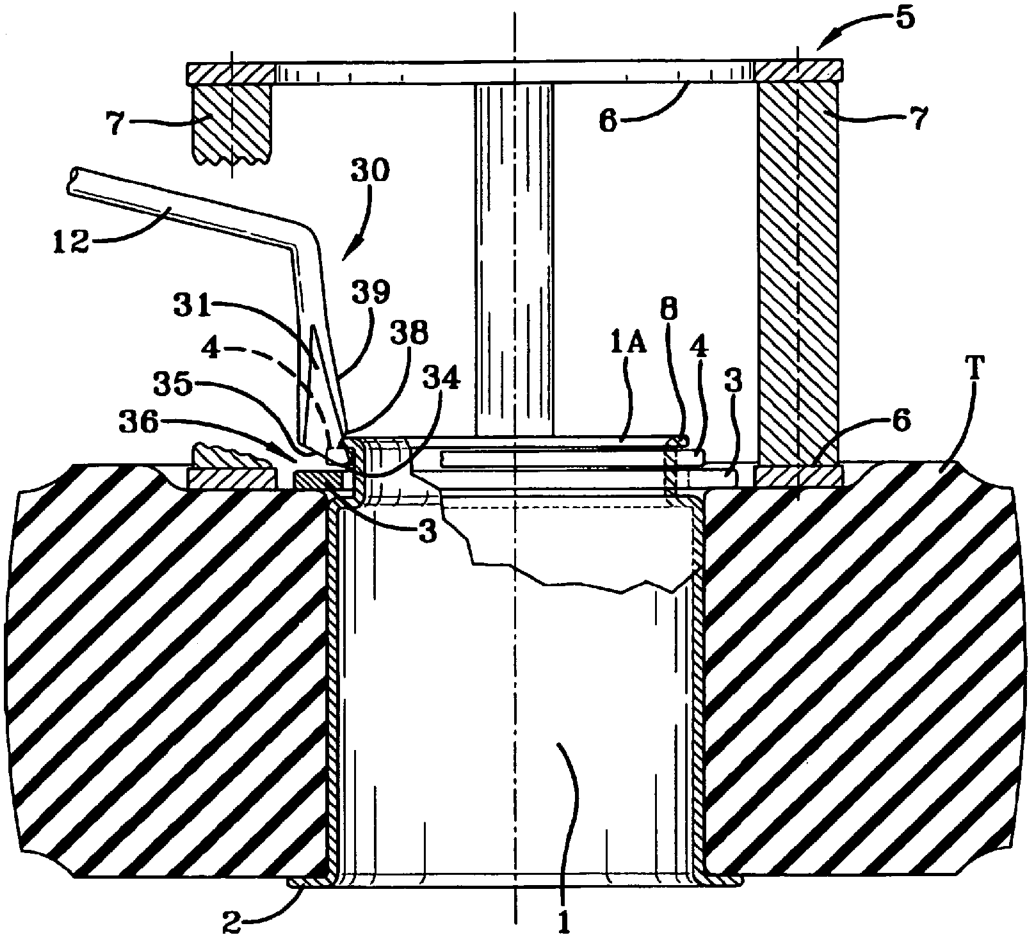
FIG. 10 is a partially schematic, partially sectioned side elevational view of a tire mounted on a rim, depicting operation of the third working end.
Figure 11:
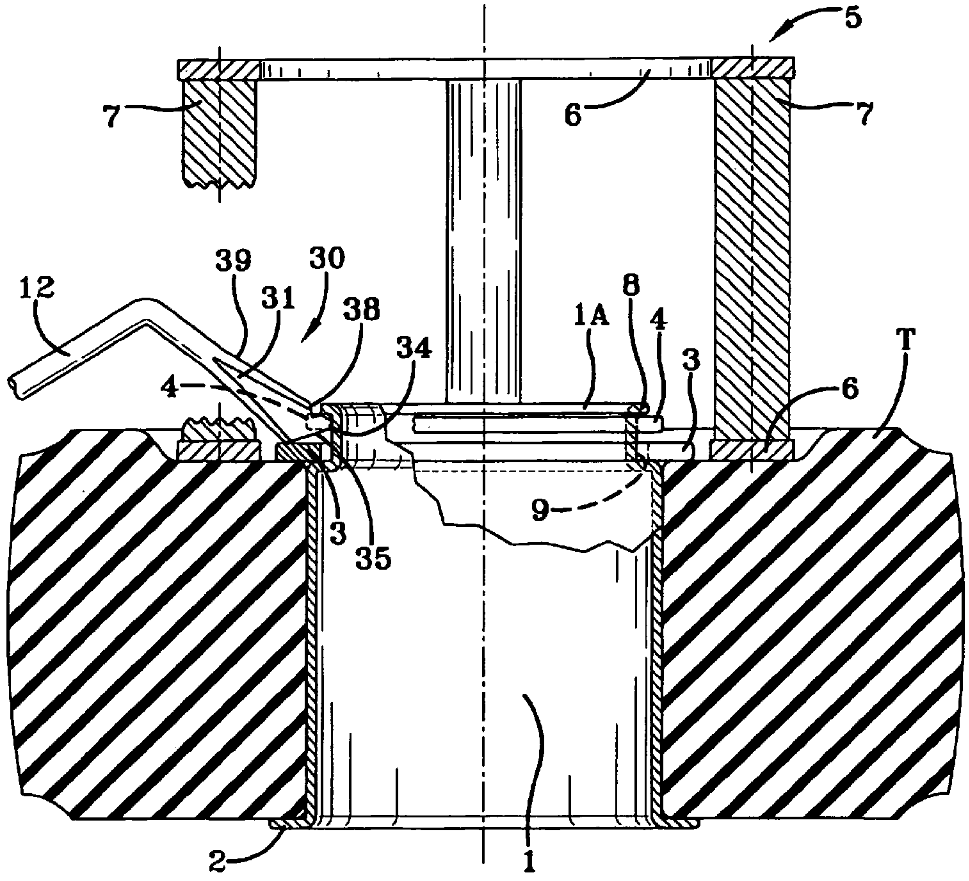
FIG. 11 is a partially schematic, partially sectioned side elevational view, similar to FIG. 10, depicting continued operation of the third working end.

To change tires, it is necessary to remove lock ring 4 and retaining ring 3 before pressing tire T off of the rim 1 with a hydraulic press. Often as a result of painting or oxidation, lock ring 4 and retaining ring 3 stick together. Since lock ring 4 rests in a recess around the top inner circumference of retaining ring 3, the two must be separated in order to remove lock ring 4, i.e., retaining ring 3, alone, must be forced down and away from lock ring 4. To that end, a ring tool 10 having an end that separates lock ring 4 and retaining ring 3 may be provided. A third working end for separating the rings referred to as a "separating end" is shown in FIG. 8 and is generally indicated by the number 30. Separating end 30 may be mounted on a handle 12 and may extend generally radially outward relative to the handle 12. In the example shown, separating end 30 extends axially outward as it extends radially outward from handle 12, forming an oblique angle $\alpha$ between the handle 12 and separating end 30. In general, separating end 30 includes an elongate body portion 31. Body portion 31 may have a width 32 corresponding to an end notch formed where the ends of the split lock ring 4 come together. The tip 33, which forms the axial and radial outermost extremity of separating end 30, is insertable within the end notch of lock ring 4 and is provided with a beveled tip end 34 that seats in groove 9 of the rim 1. The radial outer surface 35 is also beveled and sloped inward as it extends away from tip end 34. As best shown in FIG. 10, when the tip end 34 is inserted, beveled surface 35 creates a clearance 36 between the separating end 30 and retaining ring 3, allowing downward rotation of the separating end 30, as shown in FIG. 11. This downward rotation of separating end 30 progressively brings the beveled lower surface 35 to bear on retaining ring 3, breaking it free from lock ring 4.

To facilitate the separation of lock ring 4 and retaining ring 3, a notch 38 may be formed in the body portion 31 of separating end 30 adjacent to the tip 32 on the axial outward wall 39 of the separating end 30. As best shown in FIG. 11, notch 38 may capture retaining flange 8 between the ends of lock ring 4, providing leverage as the separating end 30 is rotated downward to separate lock ring 4 and retaining ring 3.

Figure 12:
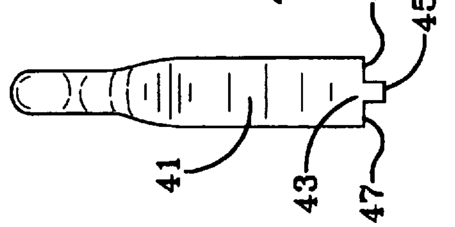
FIG. 12 is a rear elevational view of the tool depicted in FIG. 8, depicting details of a fourth working end.

With lock ring 4 and retaining ring 3 separated from each other, the demounting of tire T continues with removal of lock ring 4. To that end, one end of the split lock ring 4 is typically stretched radially outward and then lifted over retaining flange 8 of the rim 1. As discussed above, this process is typically performed with a screwdriver, creating great difficulty for the user. To that end, a ring tool 10 having a fourth working end for lifting lock ring 4 over retaining flange 8 may be provided. One example of a "lift end" is shown in FIG. 8 and generally indicated by the number 40. Lift end 40 generally includes a body portion 41 that extends radially outward from a handle 12. As best shown in FIG. 8, lift end 40 may be a claw-like member having a curved axial outward surface 42 that extends radially outward and axially inward toward a tip 43 of the body portion 41. The axial interior surface 44 of body portion 41 can also be curved, and the body portion 41 may taper inward toward the radial extremity of the tool end 40. With reference to FIG. 12, tip 43 may include a radially outward extending projection 45 that narrows to a point, as shown in FIG. 8, to facilitate its insertion between rim 1 and lock ring 4. With further reference to FIG. 12, body portion 41 may widen toward the tip 43, forming shoulders 47 on either side of projection 45. To remove lock ring 4, projection 45 may be inserted within the slot formed inside the ends of lock ring 4 and handle 12 rotated up. Handle 12 may also be rotated sideways to contact shoulder 47 against the outer edge of retaining flange 8 to provide a fulcrum and stretch lock ring 4 over retaining flange 8 by continuing to rotate handle 12.

Figure 13:
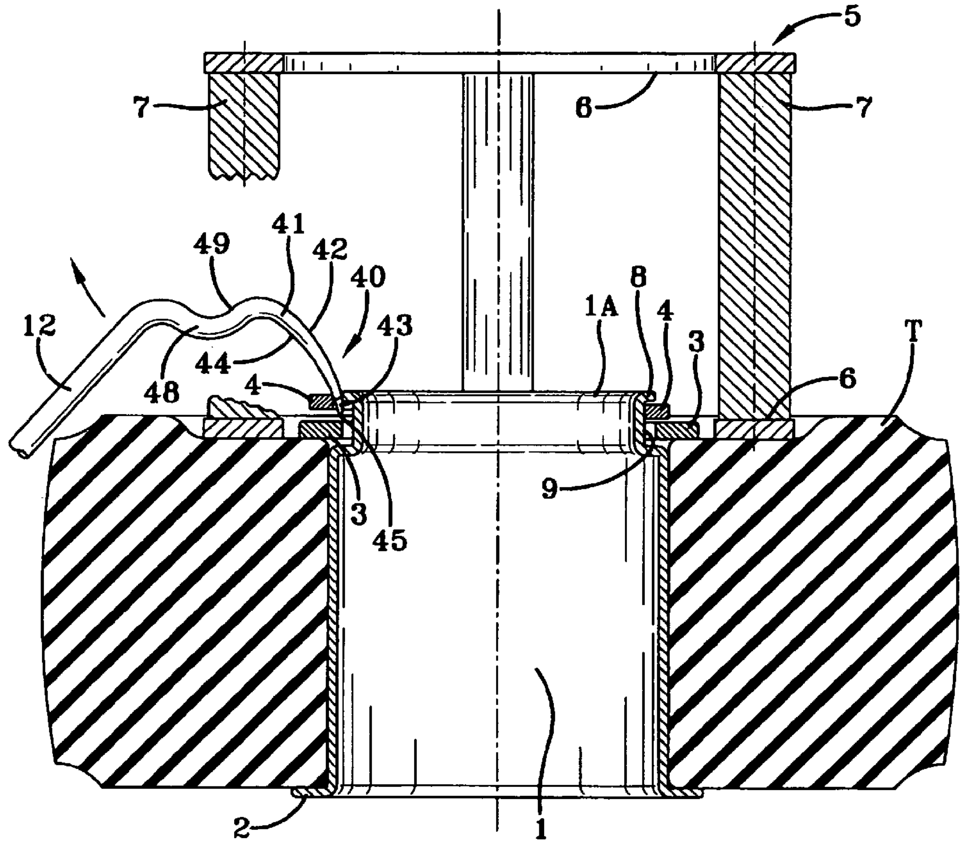
FIG. 13 is a partially schematic, partially sectioned side elevational view, depicting operation of the lifting end in the removal of a lock ring.
Figure 14:
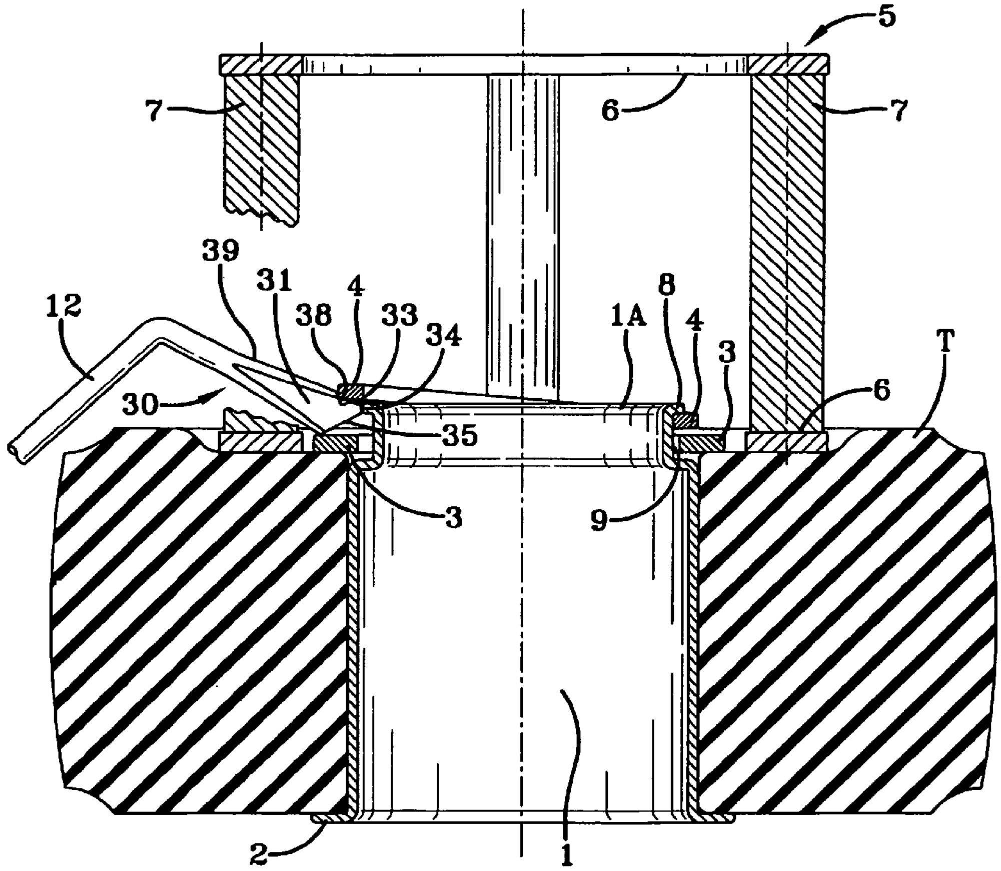
FIG. 14 is a side elevational view, similar to FIG. 13, depicting an alternative operation of the separating end in removing the lock ring.

As best shown in FIG. 13, the axial inward curvature of the body portion 41, although not strictly necessary, increases the available range of motion for the user by causing the handle 12 to angle downward when the tip 43 is inserted. To further facilitate use of the tool 10, the working end 40 may be spaced axially outward from the handle 12 by an extension 48 that extends initially radially outward and then axially outward from handle 12 to space lift end 40 from handle 12 and form a surface 49 against which the user can place their hand to hold tip 43 between lock ring 4 and rim 1.

To lift the end of lock ring 4, handle 12 is rotated upward, forcing the projection 45 downward and outward to cause the end of lock ring 4 to clear retaining flange 8 and lift lock ring 4 above retaining flange 8. After handle 12 is rotated upward, it may be moved sideways to cause a shoulder 47 to act as a fulcrum against flange 8, to raise lock ring 4 high enough to stay put. Since the axial interior surface 44 curves axially outward relative to tip 43, as lock ring 4 is lifted, the spring force within lock ring 4 that urges the end inward so that lock ring 4 would assume its original diameter causes lock ring 4 to move radially inward along a working end, preventing lock ring 4 from slipping off of lift end 40.

To completely remove lock ring 4, a solid ring tool 10 may be provided with a second working end, generally indicated by the number 50 in FIG. 1, referred to as a "removal end" herein that pries lock ring 4 over retaining flange 8. Again, this function is typically performed with a screwdriver. When using a screwdriver or other member having a straight shaft, the fulcrum is formed at the edge of the cage 5, denying the user the leverage necessary to easily lift lock ring 4 outward and over retaining flange 8. To move the fulcrum forward, removal end 50 has a first portion 51 that extends radially outward as it extends axially outward from handle 12 and a second portion 52 that extends radially inward as it extends axially outward from handle 12. The junction of first and second portions 51, 52 forms a projection 53 that extends axially outward of the arm 16 and acts as a fulcrum contacting cage 5 inward of the cage's outer edge. Second segment 52 tapers inward toward a tip 55 that is inserted beneath lock ring 4 to pry it over a retaining flange 8.

Another common problem when using a screwdriver is that the screwdriver is inserted too far, causing it to bear against the underside of retaining flange 8 and preventing it from lifting lock ring 4. To that end, a stop projection 57 may extend outward from second segment 52 axially inward of tip 55 to create a projecting surface 58 that engages the edge of lock ring 4 to prevent over-insertion of the tip 55. Stop projection 57 is spaced inwardly of the tip 55 a distance equal to or less than the width of lock ring 4.

Figure 15:
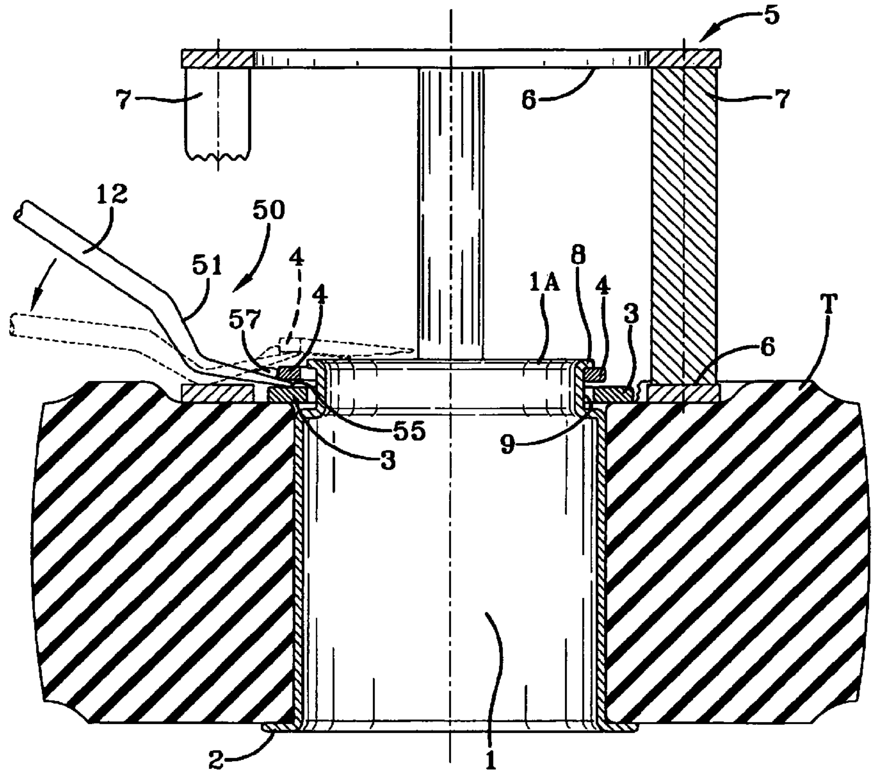
FIG. 15 is a partially schematic, partially sectioned side elevational view of a tire mounted on a rim, depicting details of operation of a second working end according to the concepts of the present invention in removing a lock ring.

As shown in FIG. 15, to remove lock ring 4, the tip 55 is inserted until stop projection 57 bears against the outer edge of lock ring 4, trapping lock ring 4 between the tip 55 and stop projection 57. Then, using projection 53 as a fulcrum, the handle 12 is rotated downward, causing tip 55 to rotate upward and outward relative to retaining flange 8, lifting lock ring 4 over retaining flange 8 to a release position indicated in broken lines. It will be appreciated that the projection 53 may also bear against retaining ring 3 or other structure and still perform the same function.

It will be appreciated that the ends 15, 30, 40, and 50 may be formed on separate tools 10 or combined on one or more tools. Also, the ends 15, 30, 40, and 50 may be formed as separate components attachable to handle 12 or, as shown, formed as a single piece. In the example shown, combined tools are formed with a pair of ends extending from each side of the handle 12. While the ends may be combined in any manner, in the configuration shown, first end 15 is shown paired with second end 50 in FIG. 15, and third end 30 is paired with fourth end 40 in FIG. 8. Considering the lifting action of ends 40 and 50, some mechanical advantage may be realized from having a radially extending end, such as ends 15, 30, and 40, located at the opposite end of the handle 12. With respect to the tool shown in FIG. 15, since end 50 effectively extends the length of the handle 12, this combination is believed to provide additional leverage for rotating end 15. It will be appreciated that similar advantage could be obtained by combining end 50 with either of ends 30 and 40. Consequently, the particular combinations shown are not to be considered limiting.

In light of the foregoing, it should thus be evident that a solid tire lock ring tool constructed as described herein substantially improves the art and otherwise accomplishes the objects of the present invention.

What is claimed is:

1. A tire ring tool used in connection with a lock ring and a retaining ring for securing a tire on a rim, the ring tool comprising: a handle; an install end supported on said handle, said install end including an arm extending radially outward from said handle, a body portion extending from said arm further radially outward in the same direction as said arm and terminating in a tip adapted for insertion between the rim and the lock ring, wherein said body portion defines a notch that extends axially outward relative to said tip between said arm and said tip.

2. The tire ring tool of claim 1, wherein said body portion includes a first portion extending axially outward from said arm and a second portion extending axially inward from said first portion toward said tip, whereby said first and second portions define said notch therebetween.

3. The tire ring tool of claim 2, wherein said second portion extends axially inward an extent greater than the axial outward extension of said first portion, whereby said tip is located axially inward of said arm.

4. The tire ring tool of claim 2, wherein said first portion and said second portion connect to each other at a vertex, wherein said vertex extends axially outward of said arm.

5. The tire ring tool of claim 1 further comprising a protrusion extending axially inward from said second portion.

6. The tire ring tool of claim 5, wherein said protrusion is in the form of a raised line, said raised line being centered on said second portion.

7. The tire ring tool of claim 1, wherein said tip has a rounded leading edge.

8. The tire ring tool of claim 7, wherein said rounded leading edge narrows to a point.

9. The tire ring tool of claim 1, wherein said tip extends axially outward relative to said body portion to define a shallow recess between said tip and said body portion.

10. A tire ring tool used in connection with a retaining ring and a lock ring for securing a solid tire on a rim, the ring tool comprising: a handle; and a separating end extending radially outward from said handle, said separating end including an arm extending from said handle, a body portion extending from said arm and having a substantially linear outer radial edge that extends from said arm and terminates in a tip at its axial and radial outer extremity; wherein said outer radial edge has a notch defined therein, said notch being proximate to said tip and opening axially outward.

11. The tire ring tool of claim 10, wherein said outer radial edge slopes radially inward from said tip.

12. The tire ring tool of claim 11, wherein said tip includes a beveled edge extending axially inward to join said outer radial edge.

13. The tire ring tool of claim 10, wherein said separating end extends axially outward as it extends radially outward from said handle forming an oblique angle therebetween.

14. A tire ring tool used in connection with a retaining ring and a lock ring for securing a solid tire on a rim, the ring tool comprising: a handle; and a lifting end extending generally radially outward from said handle, said lifting end having a body portion that curves axially inward as it extends radially outward and terminates in a tip, and a projection extending radially outward from said tip wherein said projection has a lesser lateral dimension than said tip, and wherein said tip extends laterally outward of said projection to form a shoulder.

15. The tire ring tool of claim 14, wherein said projection is laterally centered on said tip forming a pair of shoulders on either side of said projection.

16. The tire ring tool of claim 14, wherein said projection narrows axially to a point.

17. The tire ring tool of claim 14, wherein said projection curves axially inward as it extends radially outward from said tip.

18. The tire ring tool of claim 14, wherein said lifting end includes an offset extension between said body portion and said handle, wherein said extension includes a first portion extending radially outward from said handle and a second portion extending axially outward from said first portion to connect to said body portion and form a surface extending substantially parallel to said handle yet radially offset therefrom.

19. The tire ring tool of claim 14, wherein said body portion broadens toward said tip.

20. A tire ring tool used in connection with a retaining ring and a lock ring for securing a solid tire on a rim, the ring tool comprising: a handle; and a removal end extending generally axially outward from said handle, said removal end including a body portion having a first portion extending axially outward and radially outward from said handle and a second portion extending axially outward and radially inward from said first portion, wherein a joint is formed by the connection of said first and second portions, said joint extending radially outward of said handle; and wherein said second portion terminates in a tip adapted to be inserted between the lock ring and the retaining ring, said tire ring tool further comprising a stop projection extending radially outward from said second portion of said body portion axially inward of said tip, wherein said stop projection is engagable with the lock ring.

21. A tire ring tool used in connection with a retaining ring and a lock ring for securing a solid tire on a rim, the ring tool comprising: a handle; an install end supported on one end of said handle, and a removal end supported on the other end of said handle; said install end including an arm extending radially outward from said handle, a body portion extending further radially outward in the same direction from said arm and terminating in a tip adapted for insertion between the rim and the lock ring, wherein said body portion defines a notch that extends axially outward relative to said tip between said arm and said tip; said removal end including a body portion having a first portion extending axially outward and radially outward from said handle and a second portion extending axially outward and radially inward from said first portion, wherein a joint is formed by the connection of said first and second portions, said joint extending radially outward of said handle, and wherein said second portion terminates in a tip adapted to be inserted between the lock ring and the retaining ring.

22. A tire ring tool used in connection with a retaining ring and a lock ring for securing a solid tire to a rim, the ring tool comprising: a handle; a separating end supported on one end of said handle and a lifting end supported on the opposite end of said handle; said separating end including an arm extending from said handle, a body portion extending from said arm and having a substantially linear outer radial edge that extends from said arm and terminates in a tip at its axial and radial extremity, wherein said outer radial edge has a notch defined therein, said notch being proximate to said tip and opening axially outward; said lifting end having a body portion that curves axially inward as it extends radially outward and terminates in a tip, and a projection extending radially outward from said tip wherein said projection has a lesser lateral dimension than said tip, and wherein said tip extends laterally outward of said projection to form a shoulder.

23. The tire ring tool of claim 22, wherein said lifting end and said separating end extend radially outward from said handle in the same direction.

24. A tire ring tool kit comprising: a handle, an install end, a removal end, a lifting end, and a separating end supportable on said handle; said install end including an arm extending radially outward from said handle, a body portion extending further radially outward in the same direction from said arm and terminating in a tip adapted for insertion between the rim and the lock ring, wherein said body portion defines a notch that extends axially outward relative to said tip between said arm and said tip; said removal end including a body portion having a first portion extending axially outward and radially outward from said handle and a second portion extending axially outward and radially inward from said first portion, wherein a joint is formed by the connection of said first and second portions, said joint extending radially outward of said handle, and wherein said second portion terminates in a tip adapted to be inserted between the lock ring and the retaining ring; said separating end including an arm extending from said handle, a body portion extending from said arm and having a substantially linear outer radial edge that extends from said arm and terminates in a tip at its axial and radial outer extremity, wherein said outer radial edge has a notch defined therein, said notch being proximate to said tip and opening axially outward; said lifting end having a body portion that curves-axially inward as it extends radially outward and terminates in a tip, and a projection extending radially outward from said tip wherein said projection has a lesser lateral dimension than said tip, and wherein said tip extends laterally outward of said projection to form a shoulder.

* * * * *